(No Model.)
J. H. IRWIN.
ELECTRIC LANTERN.
No. 261,352. Patented July 18, 1882.
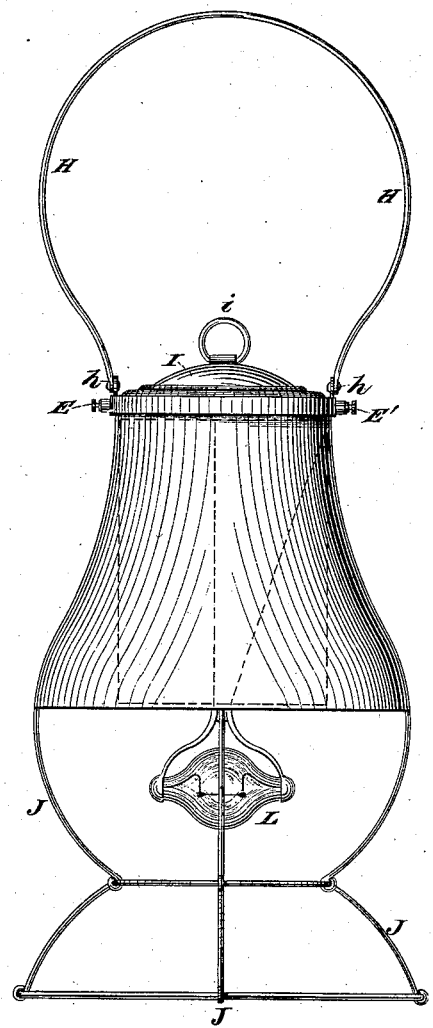
Witnesses:
Charles R. Searle.
John Buckler.
Inventor:
John H. Irwin.
By A. M. Pierce,
Attorney.

UNITED STATES PATENT OFFICE.

JOHN H. IRWIN, OF MORTON, PENNSYLVANIA.

ELECTRIC LANTERN.

SPECIFICATION forming part of Letters Patent No. 261,352, dated July 18, 1882.

Application filed November 12, 1881. (No model.)

*To all whom it may concern:*

Be it known that I, JOHN H. IRWIN, of Morton, in the county of Delaware and State of Pennsylvania, have invented certain new and useful Improvements in Electric Lanterns, of which the following is a full, clear, and exact description, reference being had to the accompanying drawing and the letters marked thereon.

My invention relates especially to that class of illuminating devices fully described in an application for Letters Patent filed by me July 30, 1881, and has for its object the application of the principle and mechanical construction therein set forth to a hand-lamp or lantern for outdoor use, a secondary battery being located in a receptacle above the incandescent electric lamp, as hereinafter explained; and my invention involves certain novel and useful combinations or arrangements of parts and peculiarities of construction and operation, all of which will be hereinafter first fully described, and then pointed out in the claims.

The accompanying drawing shows in elevation a view of a hand-lamp or lantern embodying my improvements.

A is the battery-holder, constructed of hard rubber or any other suitable material. Said holder is situated in the upper portion of the structure, the whole being given the form of an ordinary lantern, rendering it convenient for carrying in the hand.

The interior parts of the battery and its connections with the binding-posts E E' and the small incandescent lamp L are indicated by the dotted lines, the battery employed being of the secondary type well known and understood by those skilled in the art to which my improvements relate. Said battery is charged from a suitable electric generator through the binding-posts E E' and their connections.

By placing the battery above the lamp a free and unobstructed space is left for the light, allowing it to be thrown in all directions around the user.

H is a metal bail for carrying the device in the hand. It is secured to the top of the structure by means of ears $h$ in such a manner as to permit the suspended battery and lamp to swing freely.

I is a cover fitting over the casing of the battery, and may be easily removed by means of the ring $i$ when it is desired to reach the interior of the holder.

J is a guard or support for the lamp, constructed of suitable material, not only serving to protect the lamp from injury, but as a support for the device when at rest.

Having now fully described my invention, what I claim as new therein, and desire to secure by Letters Patent, is—

1. An electric lantern composed of a framework, the upper part of which supports a secondary battery, an incandescent electric light supported directly below such battery, and electrical connections for connecting such battery with the lamp, substantially as described.

2. An electric lantern composed of a framework, the upper part of which supports a secondary battery, an incandescent lamp supported directly below such battery, electrical connections for charging such battery, and electrical connections between such battery and the lamp, a bail for carrying the lantern, and a removable top to give access to the battery, substantially as described.

In testimony that I claim the foregoing I have hereunto set my hand in the presence of two witnesses.

J. H. IRWIN.

Witnesses:
A. M. PIERCE,
F. W. HANAFORD.